April 21, 1953    A. G. HERRESHOFF    2,635,704
VEHICLE SUSPENSION FOR DRIVEN WHEELS
Filed June 14, 1949    2 SHEETS—SHEET 1
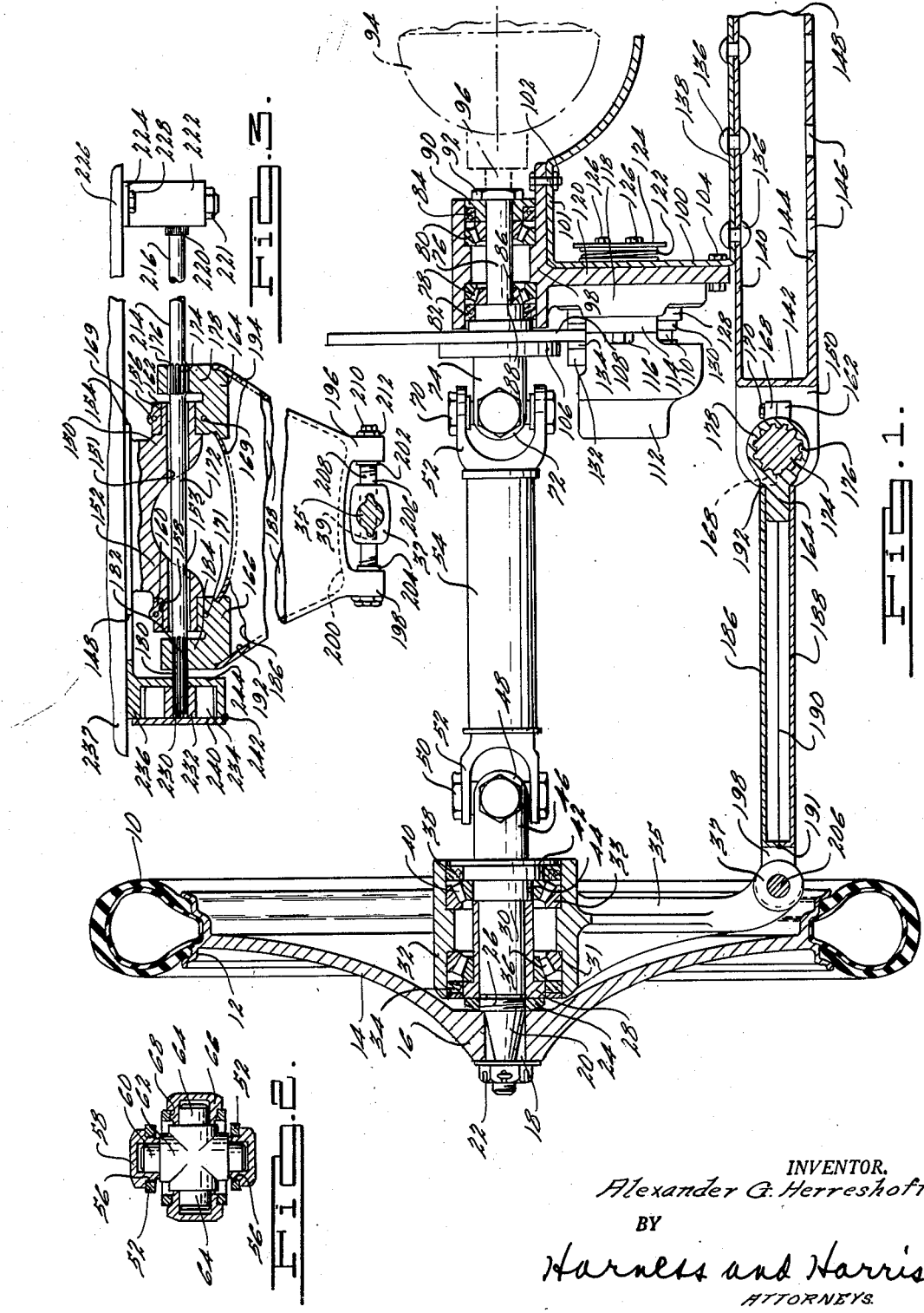
INVENTOR.
Alexander G. Herreshoff
BY
Harness and Harris
ATTORNEYS.

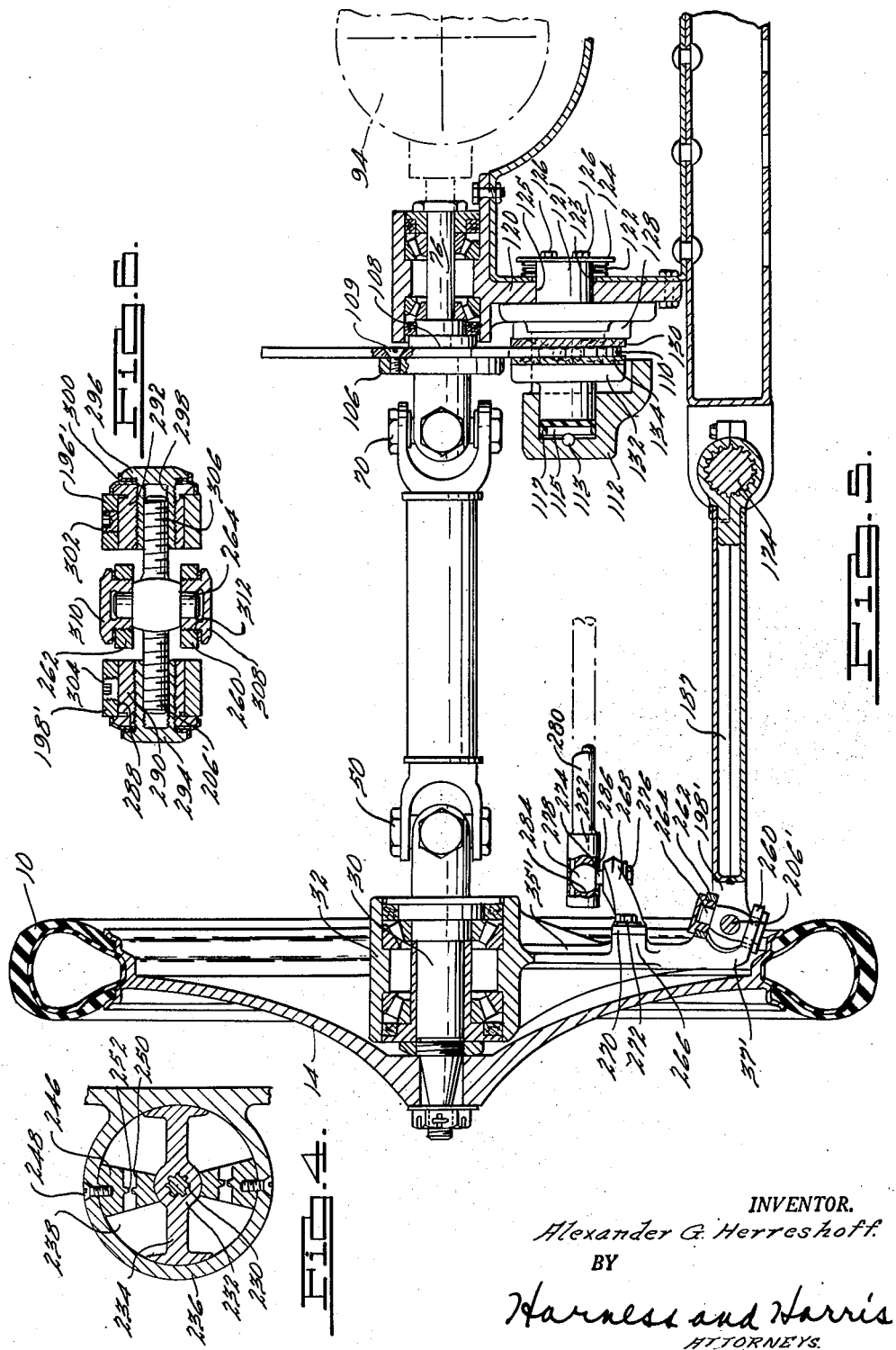

Patented Apr. 21, 1953

2,635,704

UNITED STATES PATENT OFFICE 2,635,704

VEHICLE SUSPENSION FOR DRIVEN WHEELS

Alexander G. Herreshoff, Grosse Pointe, Mich., assignor to Chrysler Corporation, Highland Park, Mich., a corporation of Delaware Application June 14, 1949, Serial No. 99,090

5 Claims. (Cl. 180—43)

1

The invention relates to wheel suspensions for sprung vehicles particularly automotive vehicles as, for example, of the racing type.

An object of the invention is to provide a suspension for a sprung vehicle of a character such that the actual unsprung parts are reduced to a minimum.

A further object of the invention is to produce an independent wheel suspension whereof the axle is made to serve an additional purpose in the capacity of a conventional upper control arm.

Another object is the provision of a lower control arm in a suspension at a position in exaggerated downward spacing relative to the level of the wheel axle with a view to relieving the wheel axle of tensile and compressing stresses to an extent as may be desirable.

Still a further object is to provide vehicle wheel structure from which the conventional brake drum is absent and braking is effected by mechanism carried by sprung portions of the vehicle.

Yet a further object is to provide a simplified suspension readily adaptable for connection to a dead axle or a live axle and operable either as a non-steerable wheel or as a steerable wheel.

Still another object is the provision of a suspension for a vehicle whereof the resilient load spring contributes as little as possible to the overall unsprung weight and rotational inertia of the vehicle suspension.

Other objects will become apparent from the following description taken in connection with the attached drawings showing several illustrative embodiments of the invention and wherein:

Figure 1 is a longitudinal elevational view of a wheel suspension suitable for the rear or trailing wheels of the vehicle according to the invention;

Figure 2 is a sectional view of a universal joint such as may be incorporated in the structure of Figure 1;

Figure 3 is a plan view of the structure of Figure 1 with certain parts broken away for the purposes of clarity;

Figure 4 is a section taken through the shock absorber of Figure 3;

Figure 5 is a longitudinal elevation of a modified form of the invention suitable for a steerable ground wheel; and Figure 6 is a section taken through a joint of the modification of Figure 5.

As respects Figure 1, the invention contemplates road wheel structure comprising a tire 10 which may be held on a rim 12 formed about web member 14. Web member 14 may be slotted

2 to give it a spoke or wire wheel effect and together with rim 12 may be of suitable light weight construction such as magnesium might afford. Inwardly of member 14 may be a hub 16 formed with a beveled spline opening for receiving a counterpart beveled spline construction 18 on the member 20. A nut 22 serves to hold the beveled spline members in close intimacy. The member 20 forms an extension of a shaft member 30 having a threaded portion 26 over which may be fitted a nut 24. The shaft member 30 is received in a bushing 28 engaged by the nut 24. Housing 32 may be provided with suitable shoulders as at 31 and 33 for receiving bearings 36 and 40 in which the bushing 28 is rotatably supported. Suitable oil seals 34 and 38 may be located at either end of housing 32. By means of the flat nut 24 the assembly may be drawn together whereby shoulders 44 and 42 on member 30 fit firmly against the bearing 40 and seal 38 respectively. Carried at the inner end of member 30 is a shaft 46 having a yoke portion such as at 48 adapted to receive one component of a universal joint 50. Member 54, an axle portion provided at each end with yoke portions 52, thereby receives one portion of universal joint 50 and another portion of a universal joint 70.

As regards Figure 2, the makeup of such a universal joint as employed at 50 or 70 in Figure 1 is shown. In yoke portions 52 are received bushings 58 by suitable threading 56. Within bushings 58 are disposed trunnions 60 formed on a universal element 62. Other trunnions on element 62 as indicated at 64 are disposed within similar bushings 66 held in another yoke by suitable threading at 68. Such a joint serves the purpose of providing a universal action between the cooperating yokes, which latter provide the necessary support for it. When these yokes are suitably arranged at the end of a shaft, it is possible that the connections in which they terminate may be mutually afforded constant angular velocity as contrasted with a constant angular velocity for one terminating member and a variable angle velocity for the other.

By way of return to Figure 1, yoke 72 is carried by a member 74 which goes to constitute the outer end portion of a rotatable inner shaft 76. A set of tapered bearing races indicated at 86 surrounds the rotatable shaft 76 and engages a shoulder 88 thereon. The bearing races 86 include a set of conical bearings 78 therebetween, and by means of bearings 78 and 80 and oil seals 82 and 84 the shaft 76 may be suitably journaled for rotation in a housing 98. At the inner end of housing 98 may be provided a bushing 90 held in place by a suitable nut 92 and adapted to receive a shaft as shown at 96 in case a differential 94 or other drive is desired to be employed for driving the road wheel. Otherwise shaft 96 and member 94 might be omitted. The housing 98 and its depending portion 120 may be affixed to frame members 101 and 100 of the frame of the automotive vehicle by means of fasteners 102 and 104. A reinforcing disk 106 and brake disk 108 are carried on member 74 for rotation therewith. The outer reaches of the brake disk 108 as at 110 are to pass through a brake structure in the nature of an open casting for providing the necessary braking. Member 112 of the braking structure is provided with a flange 114 to be secured by a screw such as at 116 to the cooperating member 118. Member 118 with which member 112 is rigid abuts against member 120 of the housing structure and is urged to place through the medium of a spring 122 acting between the frame member 100 and a backing plate 124 to which member 118 is attached by fastening means 126. Jaw 128 relatively fixed within the braking structure, carries a friction face 130 or shoe, which bears against the brake disk 110. A relatively movable jaw 132 within the braking structure carries a shoe 134 which is adapted to be urged into contact with the brake disk 110. The spring 122 serves to afford a floating action as regards the braking structure and as the jaws are forced together the shoes 134 and 130 tend to equalize as between themselves and share the burden of applying friction to the disk.

To frame member 138 is attached another frame member 140 by fasteners such as rivets at 136. Frame member 40 may constitute the top part of a box-like construction comprising an end member 142, a side member 148, and a bottom member 144. Lightening holes 146 may suitably be provided in the member 144 with the additional view in mind of providing access to the box. An outrigger 150 may be attached to the wall 148 upon which may be formed a bearing structure 162 suitably covered by a bearing cap 163. The bearing cap may be held in place by a suitable fastener such as at 170. A torsion spring is adapted to be passed through the inside of the journal just described to provide at its portion 174 suitable splines which are received in a portion 164 of a forging or cast member. Forging 164 may have a portion 178 for receiving the splines and an additional portion 168 and 162 for providing the bearing for the journal formed on member 150. Attached to the end of forging 164 may be provided a structure which can be fabricated from halves 186 and 188, which may be suitably formed of sheet stampings. A weld such as at 191 will serve to join the halves along their common boundary 190 and also to attach the halves as at 192 to forging 164. An outer member 198 is formed on the fabricated structure to provide a suitable attaching point for a pivot bar 206 carried on the end portion 37 of the arm 35 attached to housing 32.

As regards Figure 3, the wheel construction of Figure 1 is shown in plan view. Extending laterally from the side walls 148 and 154 are members 152 and 156 which have internal bores 153, 151 respectively and on which are formed journals 158 and 156. The bearings 162 and 160 received for support on these respective journals are formed in members 164 and 166 and provided with suitable apertures as at 169 and 171 for the reception of the fasteners for the bearing caps. Arms 178 and 184 formed on the respective members 164 and 166 are provided with splines for receiving splined portions 174 and 182 at either end of a portion 172 of a torsion bar. The top half 186 and bottom half 188 are fabricated together as by welding along their common boundary 190 in a manner such as mutually to provide a set of outwardly tapering walls 192 and 194 which are connected at their inner relatively wide end to members 164 and 166. At the relatively narrow end of the fabricated structure adjacent outer wall 200 are formed bored members 196 and 198 extending outwardly from the walls 192 and 194. In the bores of members 196 and 198 are received eccentrics 202 and 204 which may be mounted by means of adjustment nuts and fasteners 210 and 212 to provide suitable correction for toe-in and camber of the wheel as necessary. Eccentrics 204 and 202 are provided with eccentric bores threaded to receive a pivot bar 206 on which is provided suitable threading 208. It is by means of this threading that adjustment of the wheel in a fore and aft direction of the car may be readily accomplished. Supported on rock shaft 206 is the arm 39 by its attaching portion 37. From the fabricated structure the torsion bar extends for a portion 214 and to a successive portion 216 adapted to terminate at some point relatively remote to the wheel suspension. At the end of portion 216 are disposed splines 220 adapted to be received in a non-rotatable fashion by a member 222, which is provided with suitable locking means 221 in order securely to grip the splines 220. A flange 224 on member 222 serves to adapt member 222 for attachment to the automobile frame 226 through a suitable fastener 228. The portion 189 at the opposite end of the torsion bar is provided at its terminal with splines 230 received in the hub 232 of a rotary shock absorber. The hub 232 carries blades 234 which may be rotated by suitable movement of the torsion bar within the body 236 of the shock absorber suitably attached to the automobile frame 237. The end wall 240 of the shock absorber which is disposed opposite to another wall 244 may be permanently affixed to abut member 236 such as by a weld at 242.

A section view of the foregoing shock absorber appears in Figure 4. Splined member 230 carries hub 232 which will be seen to mount blades or vanes 234. Body 236 of the shock absorber may contain suitable liquid in the cavity 238, which will tend to be displaced during operation of the shock absorber by blades 234. Held in place by a fastener 248 may be shock absorber partitions 246, which serve to divide the body 236 into separate chambers. Ports 250 serve to establish communication between the chamber and a throttling orifice such as at 252 is provided to regulate the flow of the fuel transmitted through the ports from one chamber to another.

The operation of the device described in preceding Figures 1 through 4 is generally as follows. If the wheel is to serve as a driving wheel then torque is transmitted from the differential 94 through connected shaft portions 96, 76, 74, 54, 46, 30, and 20 to the wheel structure. Inasmuch as member 30 is suitably journalled in the housing 32, a torque will necessarily be imparted to the road wheel and tire 10. If the wheel is not to be used as drive wheel, then torque is transmitted in the opposite fashion from tire 10 through the wheel and through the respective shafts or axles to shaft 76 which merely deadends or idles rotationally freely in its housing 98.

Universal joints 50 and 70 are so disposed relative to one another that whether the case is that member 46 is driving or that member 74 is driving the angular velocities are matched and so long as the input member undergoes constant angular velocity then the output member will transmit substantially constant angular velocity under all conditions. Universal joints 50 and 70 serve also to transform the axle into the upper link of the two-link suspension. No slip joints will be seen to appear for reason that the axle and tensile and compressive stresses are transmitted directly through the link 54. Without restraint, members 46 and 30 would obviously be allowed free movement since they are at the end of the flexibly mounted yoke 48. Housing 32, however, serves to restrain the end of axle 30 and to keep its axis of rotation always substantially horizontal and normal to the longitudinal axis of the vehicle. The lower end 37 of arm 35 depending from housing 32 is restrained not only from swinging movement in a counterclockwise and clockwise sense in the plane of the paper in Figure 1 such as to prevent the axis of axle 30 from tilting out of the horizontal, but also there is precluded any tendency for the arm 35 and housing 32 to rotate about the axis of axle 30 in the plane of the wheel and tire 10. Fore and aft adjustment of housing 32 is accomplished, as pointed out by means of threading 208 on the pivot member 206. Also as noted, camber and toe-in corrections may be accomplished through suitable adjustments of eccentrics 202 and 204. Once, however, as these adjustable devices are locked in position, the housing 34 which carries the road wheel structure is prevented from any further lateral or rotative play.

The fabricated structure including the stamped portions 186 and 188 is fixedly restrained to rotate about the journals 156 and 158 carried by the frame of the automotive vehicle. Except for vertical movement in a lateral direction relative to the vehicle frame the fabricated structure, serving as lower link for the two-link suspension, provides a stable and restraining action to the suspension system. As may be observed in Figure 1 particularly, the lower link constituted by the fabricated structure is spaced a substantial distance below the upper link such as constituted by member 54 with the effect of unloading the upper link as much as possible of the reactive stresses necessarily set up in the suspension. Suitable supporting torsion is provided the lower link of the suspension by a portion 174 of the torsion bar and transmitted therefrom by the splines 176. Rising and falling movement of the wheel is damped by the shock absorber carried at the terminal of portion 180 of the torsion bar. As the brake member 132 is applied, the braking torque impressed on the brake disk 108 is transmitted through link 54 to the wheel structure and the twisting reaction resulting from restraint of the wheel and tire 10 is taken up through the arm 35 carrying the bearing housing for the wheel and the lower link of the suspension. Owing to the exaggerated spacing between the upper and lower links the upper link tends to relieve all undue stresses by the wide and relatively stable lower link. Link 54 will be seen to accomplish the two-fold purpose of transmitting torque either from the road wheel and tire 10 to the brake disk 108 or from the drive shaft 96, if such there be, to the road wheel and meanwhile acting as the upper link of the suspension of which universal joints 50 and 70 serve as the pivot points thereof. As the road wheel rises and falls relative to the vehicle frame, the upper and lower links maintain relatively constant spacing to one another and constrain the plane of rotation of the wheel in a substantial vertical direction. The inner shaft member 76 is prevented such as by conical bearings 78 and 80 from allowing lengthwise play in the wheel axle and in general restraining the road wheel from movement otherwise than desired.

As regards Figure 5, a modified construction is shown which makes possible the use of the road wheel and its structure 14 as a steerable wheel for a vehicle. Member 30 carried in the web 14 is suitably attached by universal joints 50 and 70 for rotation respecting the vehicle frame. A backing plate 106 rigidly secured to the axle portion 76, has a brake disk 108 secured thereto as by screws, not shown. The axle portion 76 may rotate either in an idling fashion in a hollow housing or else be suitably attached to drive means such as the differential 94 shown in phantom lines for drive. In either case member 76 is rotatably held fixed against axial movement. In the housing 120 is carried the member 121 of the vehicle brake. Member 121 extends through an aperture 123 in the frame of the vehicle and carries on its end a flange 124 held in place by fasteners 126. The resilient means 122 acts to urge member 121 into a position to the right as respects bore 125 in the member 120. Rigidly carried with the shiftable member 121 is the opposed member 112 in which may be supported the movable jaw of the disk brake. Hydraulic fluid may be utilized to actuate the brake and be introduced through a port 113 into a chamber 115 formed behind the sealing cup 117 of the brake. Entry of hydraulic fluid will tend to move cup 117 to the right and with it the movable jaw 132 carrying the brake lining 134. As the gap between the friction surfaces 134 and 130 tends to decrease, the disk portion 110 is engaged and by virtue of the floating arrangement afforded by the brake-carrying member 121 an even pressure may be applied to the disk 110.

The lower link 187 of the construction of Figure 5 may be generally of the same form as to its inner end adjacent torsion portion 174 as was described for the embodiment of Figure 3. The outer or converging end 198' of the link 187 is adapted, however, to cooperate with a slightly modified arm 35' which supports the bearing housing 32 for the road wheel structure. Carried by the eyes formed in member 198' and its opposing ear member is a pivot 206' which is adapted to have rotational movement relative to the member 37'. In ears 260 and 262 formed at the end of portion 37' are received bushings for supporting trunnions 264 carried integral with the pivot 206'. The road wheel comprising structure 14 may thus be adapted to revolve about an axis passing through trunnion 264 and the universal joint 50. The boss 266 formed on arm 35 is adapted to receive a flange 270 attached by a fastener 272 which is formed on a steering arm 268. Mounted on the steering arm by a fastener 276 is a stub member 274 which carries a ball 278. A steering link 282 provided with walls 284 defining a socket is adapted to embrace ball 278 and hold it permanently therewithin by means of a locking plate 286. The inwardly extending portion of the steering link 282 is adapted to have an inwardwise connection with the steering gear and steering arms.

In Figure 6 is shown a section through the pivot bar 206' in order to bring out the connection existing between arm 35' of bearing housing 32 and lower link 187. End portions 196' and 198' of lower link 187 are adapted to receive eccentrics 292 and 290 within their relatively smooth bores such as at 288. Set screws 302 and 304 serve to lock the eccentrics firmly against movement within the bores. Carried within eccentrics 292 and 290 by suitable threading 298 are bushings such as 296. Bushing 296 is itself provided with threads for receiving the threaded end 306 of pivot bar 206'. Carried in the center of the threaded member 206' is a trunnion device 264, the ends of which are received in bushings 308 and 310. Bushings 308 and 310 are threadably received as at 312 in the ears 260 and 262 formed on depending arm 35' of the bearing housing.

Adjustment of the joint of Figure 6 may be accomplished in much the same manner as was noted for the preceding embodiment. The threadable member 206' may be shifted in a fore and aft direction relative to the ears 198' and 196' by screwing it along the bushings 294 and 296. The camber and toe-in adjustments may be made by releasing the fasteners 304 and 302 and suitably readjusting the eccentrics 290 and 292 by appropriate rotation thereof. The threading 298 may be utilized to adjust the relative position of the bushing 296 to the eccentric 292 during such times as the fastener means 309 are released.

The operation of the embodiment of Figures 5 and 6 may be expected to conform somewhat according to the following. Regardless of whether axle member 76 is a dead or live axle, the upper link of the two-link suspension will serve in the dual capacity of transmitting torque from the wheel to the frame and vice versa and to provide the pivoting action in the capacity of upper link. The restraint imposed on the suspension by lower link 187 is not as comprehensive, however, as was disclosed for the corresponding element in the preceding embodiment. It is true, of course, that the arm 35' carrying axle housing 32 is prevented, owing to the restraint on its lower end 37', from a rotating movement in the plane of the wheel and also from a clockwise or counterclockwise movement such as would tend to tilt the axle 30 from the horizontal. The aligned pivots provided by members 264 and 50 make possible the turning of the structure 14 and road wheel about an axis oblique to the vertical. Thus when the steering link 282 is actuated, a turning movement is imparted through steering arm 268 to the housing arm 35' whereupon the wheel may be used to steer the vehicle upon which it is mounted. Rising and falling movement may again be controlled by the torsion bar having the portion 174 since its respective ends are attached to the vehicle frame and to a suitable damping device.

The foregoing constructions will be at once apparent as having certain desirable features in common. The so-called unsprung portions of the suspension have been effectively removed from the road wheel structure and mounted as much as possible on the vehicle frame. It is to be noted that there is no need for a brake drum on the road wheel structure of Figures 1 and 5 since the brake has been removed inwardly and carried on the frame. These suspensions will be seen, insofar as concerns their link portions spaced from the sprung portion, to be devoid of appreciable shock absorber structure and load spring mass. That is to say, the torsion bar affords a minimum of rotational inertia as disposed and also the shock absorber has been arranged to accomplish the same end. Inasmuch as the wheel webbing 14 and rim 12 may be of magnesium or other light material, the entire inertia of the unsprung portion of the suspension may be generally a bare minimum. It follows that the rising and falling movement of the wheels may then transpire at a relatively rapid rate and the tires thereon will tend to be kept in contact with the ground surface to a relatively great degree. The added weight and inertia such as may be due to a rigid upper link in such constructions as where the road axle is provided with a slip joint and serves to transmit torque only will be seen to be absent from the constructions of Figures 1 and 5.

It will be seen that I have provided a construction which satisfies the objects enumerated above and while I have shown the invention in certain physical embodiments, it is to be understood that modifications of the structure shown may be made by those skilled in the art without departing from the general spirit and scope of my invention.

What is claimed is:

1. In an automotive vehicle characterized by a frame and an inner shaft mounted to a lower portion of the frame for rotation with respect to the frame, a suspension comprising road wheel structure including a hub portion and a coaxial journal portion fast thereto, an axle box substantially in the plane of the wheel structure and containing bearings rotatably receiving said journal portion in a manner such as to be axially fast thereto, said axle box being provided with a member rigidly affixed to the axle box and having a depending free end, an axle portion disposed between said wheel structure and frame for constraining axial movement of the former relative to the latter, universal joint means providing a universal connection between said axle portion and said journal portion, means for rotatively and pivotally connecting said axle portion to said inner shaft, and in combination therewith, link means pivoted to swing from said frame at a location below and spaced from the inner shaft, said link means being positively connected to the free end of said depending member to hold said depending member non-rotative in the plane of the wheel structure and non-rotative in the vertical plane transverse thereto, said link means including a portion comprising transversely aligned means forming spaced coaxial recesses paralleling the swing axis of the link, and pivot bar means adapted to be carried by said free end and pivotally received in said recesses, said pivot bar means and free end having a pin joint connection therebetween providing for relative pivotal movement between said pivot bar means and free end so as to permit motion of said depending member and axle box about an oblique rotational axis passing through said free end.

2. In a vehicle characterized by sprung and unsprung assemblies, in combination with the sprung assembly, a spring suspension system including a universally jointed axle attached at a point of location to the lower parts of the sprung assembly for relative rotation with respect to said sprung assembly, road wheel structure comprising a hub portion and an attached coaxial journal portion, said wheel structure being linked to the sprung assembly by means of said universally jointed axle, certain means for holding the wheel structure erect comprising a supporting member having bearing means therein receiving said journal portion of the wheel in axially fast and bearing providing relation and having a relatively depending portion and a disposition relative to said sprung assembly whereby torsional rigidity may be effected between said sprung assembly and said depending portion from the supporting member, said certain means further comprising a rigid member swung for vertical movement from a location on the sprung assembly below and spaced from said point of location, and other means operatively connecting said rigid member and the depending portion from the supporting member for causing the latter to be torsionally rigid with respect to the sprung assembly, said other means comprising pivot bar structure and a structure formed with recesses for the reception of said pivot bar structure, said pivot bar structure and said recess-forming structure being attached one to the portion depending from the supporting member and the other to the rigid member so as to be coaxial and mutually transverse with respect to the said members, said pivot bar structure further having a pin joint connection to the said one of the members to which it is attached as aforesaid, said members being each rotatable with respect to said pivot bar structure about mutually perpendicular axes.

3. A vehicle adapted for travel along a horizontal surface and having a two-link independent wheel suspension provided at each of the opposite sides thereof, each said suspension having the two links thereof extending laterally and being vertically spaced with the upper link having a plurality of universal joints between the ends thereof, means rotatably connecting the inner end of the upper link to a lower portion of the vehicle, means pivotally connecting the inner end of the lower link for swinging movement about a horizontal axis extending substantially longitudinally with respect to the vehicle and being in closely spaced juxtaposition to said horizontal surface, a universal joint, and a wheel-carrying element disposed at the outer ends of the links and being rotatably connected to the upper link and being positively connected to the lower link by means of said last-named universal joint so as to provide for universal movement between the lower link and the wheel-carrying element.

4. A vehicle adapted for travel along a horizontal surface and having a two-link independent wheel suspension provided at each of the opposite sides thereof, each said suspension having the two links thereof extending laterally and being vertically spaced with the upper link having a plurality of series-connected universal joints between the ends thereof, means rotatably connecting the inner end of the upper link to a lower portion of the vehicle, means pivotally connecting the inner end of the lower link to a lower portion of the vehicle for swinging movement about a horizontal axis extending substantially longitudinally with respect to the vehicle and being in closely spaced juxtaposition to said horizontal surface, a wheel-carrying element disposed at the outer ends of the links, a road wheel carried by the wheel-carrying element, a universal joint connecting said wheel-carrying element and said lower link to provide for universal movement therebetween about mutually perpendicular axes and being in juxtaposition to the plane of the said road wheel, said wheel-carrying element having means through which the outer end of the upper link passes and defining a relatively stationary hollow axle box, and pluralities of tapered bearing elements contained in said stationary axle box and forming a span of tapered bearings receiving the outer end of the upper link so as to connect the latter for axially fast rotative movement with respect to the wheel-carrying element.

5. A vehicle adapted for travel along a horizontal surface and having a two-link independent wheel suspension provided at each of the opposite sides thereof, each said suspension having the two links thereof extending laterally and being vertically spaced with the upper link having a plurality of series-connected universal joints between the ends thereof, means rotatably connecting the inner end of the upper link to a lower portion of the vehicle, means pivotally connecting the inner end of the lower link to a lower portion of the vehicle for swinging movement about a horizontal axis extending substantially longitudinally with respect to the vehicle and being in closely spaced juxtaposition to said horizontal surface, a wheel-carrying element disposed at the outer ends of the links, a road wheel carried by the wheel-carrying element, a universal joint connecting said wheel-carrying element and said lower link to provide for universal movement therebetween about mutually perpendicular axes one of which is inclined inwardly and intersects the upper link at the location of the outermost one of the series-connected universal joints to define a steering axis oblique to the vertical as provided by the last two-named joints as they flex to permit the associated road wheel to turn out of its own plane, said wheel carrying element having means through which the outer end of the upper link passes and defining a relatively stationary hollow axle box, and pluralities of tapered bearing elements contained in said stationary axle box and forming a span of tapered bearings receiving the outer end of the upper link so as to connect the latter for axially fast rotative movement with respect to the wheel-carrying element.

ALEXANDER G. HERRESHOFF.

References Cited in the file of this patent

UNITED STATES PATENTS

| Number | Name | Date |
| --- | --- | --- |
| 2,083,085 | Palmer | June 8, 1937 |
| 2,090,721 | Best | Aug. 24, 1937 |
| 2,133,652 | Best | Oct. 18, 1938 |
| 2,203,290 | Best | June 4, 1940 |
| 2,226,047 | Borgward | Dec. 24, 1940 |
| 2,226,406 | Krotz | Dec. 24, 1940 |
| 2,233,293 | Matthews | Feb. 25, 1941 |
| 2,330,633 | Seyerle | Sept. 28, 1943 |

FOREIGN PATENTS

| Number | Country | Date |
| --- | --- | --- |
| 133,558 | Austria | May 26, 1933 |
| 457,089 | Great Britain | Nov. 20, 1936 |
| 639,393 | France | Mar. 10, 1928 |
| 767,598 | France | May 1, 1934 |